US012632885B1

(12) United States Patent
Naderan et al.

(10) Patent No.: US 12,632,885 B1
(45) Date of Patent: May 19, 2026

(54) APPARATUS AND METHOD FOR AUTOMATICALLY ASSIGNING GENERAL LEDGER CODES TO AN ACCOUNTS PAYABLE INVOICE

(71) Applicant: AppZen, Inc., San Jose, CA (US)

(72) Inventors: Edris Naderan, San Jose, CA (US); Amrit Singhal, Sunnyvale, CA (US); Harish Venkataraman, San Jose, CA (US); Kunal Verma, San Jose, CA (US)

(73) Assignee: AppZen, Inc., San Jose, CA (US)

( * ) Notice: Subject to any disclaimer, the term of this patent is extended or adjusted under 35 U.S.C. 154(b) by 365 days.

(21) Appl. No.: 18/349,865

(22) Filed: Jul. 10, 2023

(51) Int. Cl.
| | |
|---|---|
| *G06Q 30/00* | (2023.01) |
| *G06N 3/045* | (2023.01) |
| *G06N 3/08* | (2023.01) |
| *G06Q 30/04* | (2012.01) |

(52) U.S. Cl.
CPC ............. *G06Q 30/04* (2013.01); *G06N 3/045* (2023.01); *G06N 3/08* (2013.01)

(58) Field of Classification Search
CPC ........... G06Q 30/04; G06N 3/045; G06N 3/08
See application file for complete search history.

(56) References Cited

U.S. PATENT DOCUMENTS

| | | | |
|---|---|---|---|
| 2019/0228419 A1* | 7/2019 | Sampath ................ | G06N 5/025 |
| 2020/0013098 A1* | 1/2020 | Schnitt ................... | G06Q 10/00 |
| 2021/0248325 A1* | 8/2021 | Grosset .................. | G06Q 40/12 |

* cited by examiner

*Primary Examiner* — Rokib Masud
(74) *Attorney, Agent, or Firm* — Cooley LLP

(57) ABSTRACT

A non-transitory computer readable storage medium has instructions executed by a processor to access an accounts payable invoice data set. Tuples of invoice line-items are gathered from the accounts payable invoice data set. A general ledger label is attached to each tuple to form labeled general ledger invoice line-item tuples. A single digit percentage of input information in the general ledger invoice line-item tuples is masked to form first revised general ledger invoice line-item tuples. A single digit percentage of input information in the first revised general ledger invoice line-item tuples is masked with mismatched values to form second revised general ledger invoice line-item tuples. A machine learning model is trained with the second revised general ledger invoice line-item tuples to form a trained general ledger machine learning model. An accounts payable invoice is received. The trained general ledger machine learning model is used to assign general ledger labels to items in the accounts payable invoice.

8 Claims, 6 Drawing Sheets

APPARATUS AND METHOD FOR AUTOMATICALLY ASSIGNING GENERAL LEDGER CODES TO AN ACCOUNTS PAYABLE INVOICE

FIELD OF THE INVENTION

This invention relates generally to the use of trained artificial intelligence models to process accounts payable invoices. More particularly, this invention relates to techniques for automatically assigning general ledger codes to an accounts payable invoice.

BACKGROUND OF THE INVENTION

A general ledger (GL) is a bookkeeping technique in which accounting data, such as income, expenses, assets, liabilities, and equity are posted. The accounting data may be divided into different accounts, which form a chart of accounts. A general ledger uses codes to characterize accounting data items. A general ledger code is a unique sequence of characters assigned to an accounting data item. A general ledger code may include a variety of fields, such as a department field, an account field, and a location field. General ledger codes are used to track expenses.

Assigning a GL code to a financial document, such as an invoice, is traditionally a manual process. An auditor looks at a financial document and uses experience and knowledge of the company's accounting structure to assign a GL code to the document. This process is time consuming and not scalable to large volumes of financial documents. The process is also prone to human errors since it is based on an auditor's judgment, knowledge, and expertise.

Therefore, it would be desirable to automate the process of GL coding.

SUMMARY OF THE INVENTION

A non-transitory computer readable storage medium has instructions executed by a processor to access an accounts payable invoice data set. Tuples of invoice line-items are gathered from the accounts payable invoice data set. A general ledger label is attached to each tuple to form labeled general ledger invoice line-item tuples. A single digit percentage of input information in the general ledger invoice line-item tuples is masked to form first revised general ledger invoice line-item tuples. A single digit percentage of input information in the first revised general ledger invoice line-item tuples is masked with mismatched values to form second revised general ledger invoice line-item tuples. A machine learning model is trained with the second revised general ledger invoice line-item tuples to form a trained general ledger machine learning model. An accounts payable invoice is received. The trained general ledger machine learning model is used to assign general ledger labels to items in the accounts payable invoice.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
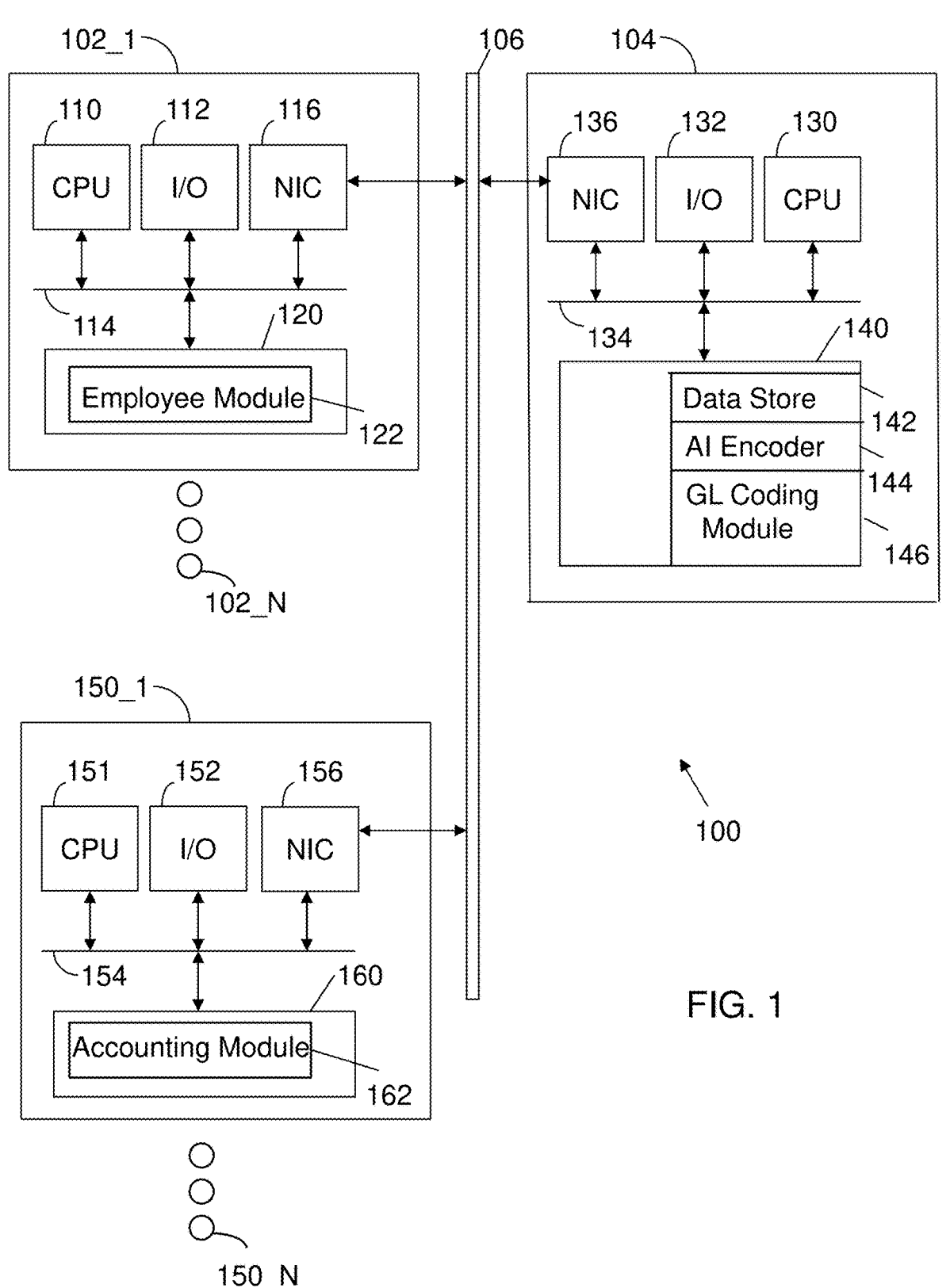
FIG. 1 illustrates a system configured in accordance with an embodiment of the invention.

FIG. 1 illustrates a system 100 configured in accordance with an embodiment of the invention. The system 100 includes employee machines 102_1 through 102_N in communication with a server 104 via a network 106, which may be any combination of wired and wireless networks. Accounting machines 150_1 through 150_N are also connected to the network.

Employee or client machine 102_1 includes a processor 110 in communication with input/output devices 112 via a bus 114. The input/output devices 112 may include a keyboard, mouse, touch display and the like. A network interface circuit 116 is also connected to bus 114 to provide connectivity to network 106. A memory 120 is also connected to bus 114. The memory 120 stores instructions executed by processor 110. The instructions are an employee module 122 that enable an employee to perform accounting functions, such as submitting invoices to server 104 and/or accounting machines 1501 through 150_N. The client machine 1021 may be a server, personal computer, tablet and the like.

Server 104 includes a processor 130, input/output devices 132, a bus 134 and a network interface circuit 136 to provide connectivity to network 106. A memory 140 is also connected to bus 134. The memory 140 stores instructions executed by processor 130 to implement operations disclosed herein. The memory 140 includes a data store 142, Artificial Intelligence (AI) encoder 144 and a General Ledger (GL) coding module 146, which are discussed in detail below.

Accounting machine 150_1 includes a processor 151, input/output devices 152, a bus 154 and a network interface circuit 156. A memory 160 is connected to bus 154. The memory 160 stores instructions executed by processor 151. In particular, the memory 160 stores an accounting module 162 that has instructions to perform enterprise accounting functions, such as invoice processing.

The data store 142 has Accounts Payable (AP) information. The AP information is in a heterogeneous graph structure. More particularly, the data store 142 is a graph database that contains multiple AP node types, such as supplier_node, entity_node, account_segment_node, location_node, invoice_item_node, and purchase_order_item_node. In one embodiment, each node has a list of attributes associated with it, which can be retrieved effectively to be used as a knowledge base of data or can be used by downstream machine learning pipelines after being transformed into input features.

There are different types of connections between the different types of nodes. The connection types capture logical relationships between different types of nodes. For example, a supplier_node and an invoice_item node might be connected by supplier_node→supplies_item→invoice item. Two nodes can be connected by multiple kinds of edges, representing different kinds of connections between them. Thus, the different edges provide additional contextual information about the relationship between nodes.

The data store 142 has a vast array of AP information in a graph structured format comprising a pre-defined set of node and edge types enabling efficient retrieval of AP information. The graph structured format facilitates the organization and visualization of diverse AP data, including vendor information, invoice details, payment history and related financial transactions.

The pre-defined node types represent vendors, invoices, payments, and financial transactions. Each node contains specific attributes relevant to the corresponding AP information. The limited edge types connect the nodes in the graph structured format, comprising edges representing relationships, such as vendor-to-invoice, invoice-to-payment, and payment-to-financial transactions, thereby establishing a comprehensive network of AP information.

The data store 142 includes executable code to search the graph database. AP information is retrieved based on user-defined queries or search criteria. The retrieval mechanism employs advanced graph algorithms and indexing techniques to optimize the search process and ensure rapid access to desired AP information.

The AI encoder 144 creates general purpose embedding representations for node items in data store 142. The embedding representations capture the semantic information present in the nodes and the structural context of the node and its connections. The embeddings are numerical vector representations of characteristics associated with a node and any edge associated with it. The purpose of learning these embeddings is to have rich representations that can be used as feature inputs for downstream models.

The AI encoder 144 is a graph neural network (GNN) model. The model takes in a graph structure as input and returns an embedding output that is semantically rich. The embedding output is used for downstream tasks over the graph data. The system learns representations that effectively capture both the attributes of individual nodes and the meaningful connections within the graph structure.

It is challenging to sample a deep contextual neighborhood around a node in a heterogeneous graph with multiple types of nodes and connections. The data distribution across different node and edge types is often imbalanced, which can impact the effectiveness of learning algorithms. To overcome this issue, an intelligent sample technique is utilized.

The sampling technique aims to create a comprehensive and rich contextual neighborhood around a target node. The sampling techniques balances the distribution of samples across different types of nodes and edges. This ensures that all types of nodes have a fair representation in the sampled neighborhood. This is achieved by re-weighting the type of distribution to align with the data distribution, allowing one to capture the potential impact or interaction of various node and edge types on a training node. For example, the node type distribution and edge type distribution may be evaluated to identify overrepresented and underrepresented node and edge types. The overrepresented node and edge types are then down sampled, while the underrepresented node and edge types are up sampled By sampling nodes and edges of all types that are likely to be relevant to the training node, we construct a contextual environment that provides a holistic view of its surroundings. This contextual neighborhood serves as valuable input for the disclosed graph neural network encoder model, enabling it to learn and emphasize important information that yields strong predictor signals.

This approach addresses the challenges of unbalanced data distribution and incomplete context by intelligently sampling and constructing a comprehensive neighborhood, enhancing the performance and accuracy of the graph neural network model. This technique holds significant potential for improving the analysis and prediction capabilities in various applications that rely on heterogeneous graph data.

The AI encoder 144 utilizes a corruption function that artificially modifies the graph structure. The corruptions aim to preserve the distribution of nodes and types around the target node but change the underlying data and data connections to create a corrupted version of the actual context around the node. Corruptions may:

Randomly choose a neighbor node that is connected to the target node and remove the connection between them.

Randomly choose a node not connected to the target node and add an artificial connection between them.

Change the density (number of neighbors of some type) of nodes of some type in the neighborhood of the target node by adding or removing nodes.

The purpose of the corruption is to manipulate the neighborhood around the target node to obtain an artificial variation of the original neighborhood. The AI encoder 144 ensures a logical sequence of corruptions taking into considerations factors, such as:

The applied corruption does not modify the target node by an enormous amount.

For example, it is advisable to remove a connection and add a connection such that an original node context is preserved, and a new node context is presented. This may be quantified by upper bounds on the difference between the original and corrupted value of quantities such as in-degree of target node, out-degree of target node, and type distribution around target node. In one embodiment, the in-degree variation is limited to a value of 2 and the out-degree variation is limited to a value of 2. In one implementation, the maximum number of variations in node types around a target node is restricted to 25% of the total number of node types connected to the target node.

The applied corruptions should not cancel themselves. The bounds involved in this process are hyperparameters that were manually tuned.

Figure 2:
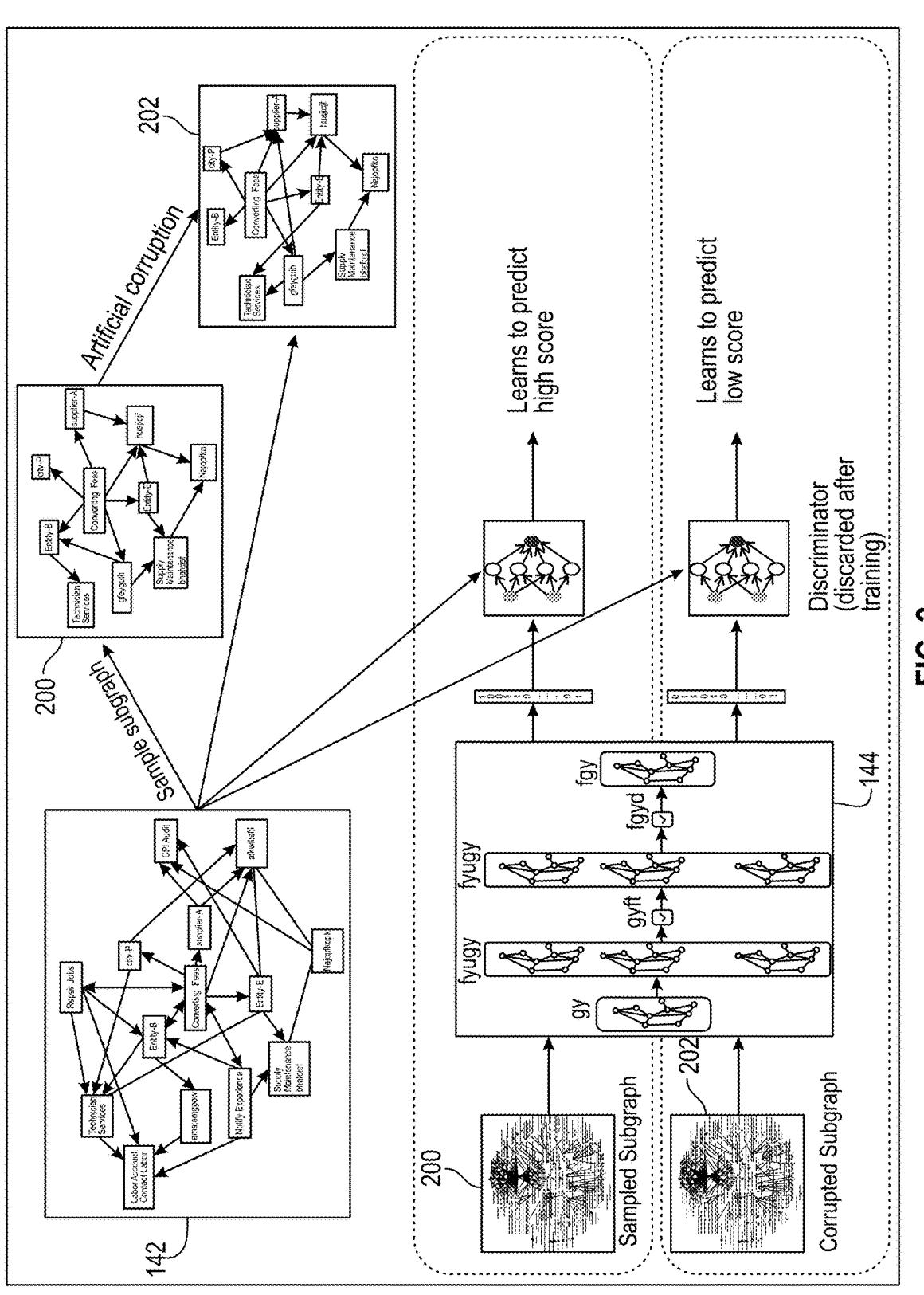
FIG. 2 illustrates sub-graph processing performed in accordance with an embodiment of the invention.

FIG. 2 illustrates the applied corruption process. The figure illustrates a graph associated with the data store 142. A subgraph 200 is derived and then an artificial corruption is applied to subgraph 200 to form a corrupted subgraph 202. Subgraph 200 and corrupted subgraph 202 are applied to AI encoder 144, which learns to predict a high score from the sampled subgraph 200, while learning to predict a low score for the corrupted subgraph 202. More particularly, the AI encoder 144 and associated multi-layered perceptron model (discriminator) are jointly trained to maximize the score between all graph aggregated features (the mean aggregation of all the raw feature vectors from the graph from all the node types, concatenated together) and the original graph sub-samples (embeddings obtained from the AI encoder 144 model being fed into the discriminator model), while simultaneously minimizing the score between all graph aggregated features and the corrupted graph sub-samples embeddings. This optimization strategy enables the GNN to learn embedding representations for nodes that effectively capture both the structural and semantic information present in the graph.

By training the encoder model on both original and corrupted samples, it generates embedding representations for the samples. These embeddings are designed to facilitate the discrimination between the original and corrupted samples by the separate discriminator model.

Again, the discriminator model is trained to maximize the score between all graph aggregated features and the original graph samples, while simultaneously minimizing the score between all graph aggregated features and the corrupted graph samples.

By combining the attributes of individual nodes and the connections within the graph structure, the AI encoder 144 produces embeddings providing a comprehensive representation of the graph. These embeddings can be utilized in various applications and analyses that require a holistic understanding of the graph's characteristics.

Figure 3:
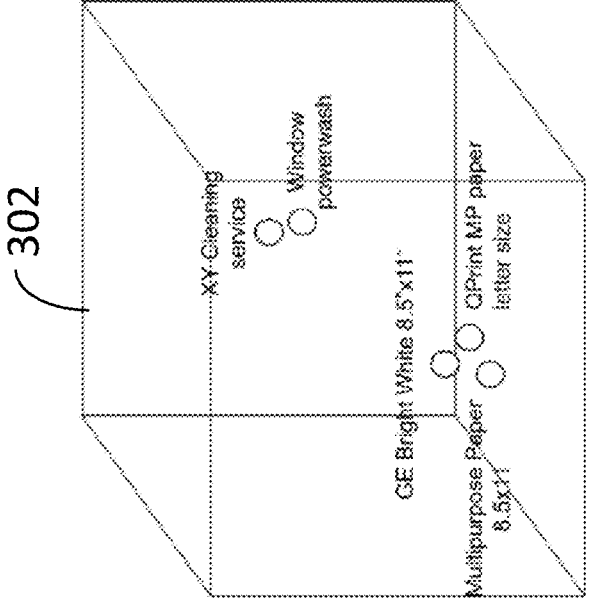
FIG. 3 illustrates clustering of goods and services in latent spaces in accordance with embodiments of the invention.
Figure 3:
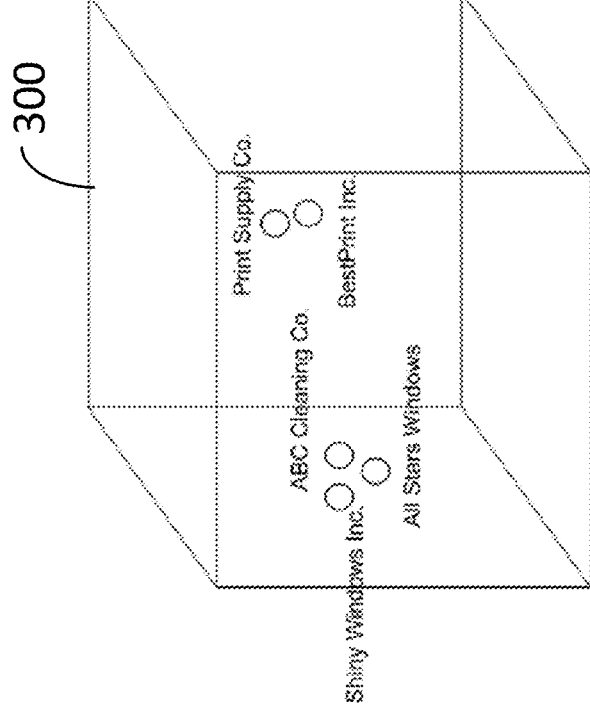

FIG. 3 illustrates a latent space 300 for suppliers. Suppliers of similar goods and services are positioned closer to one another in the latent space. FIG. 3 also shows a latent space 302 for goods and services. Similar goods and services are positioned closer to one another in the latent space.

The disclosed technique of corruption and discrimination in the model training process offers a novel and effective way to learn embeddings that capture both structural and semantic information, contributing to the advancement of graph representation learning.

The GL coding module 146 has instructions executed by processor 130 to train GL models. Subsequently, the GL coding module 146 uses the trained models to process accounts payable invoices.

Figure 4:
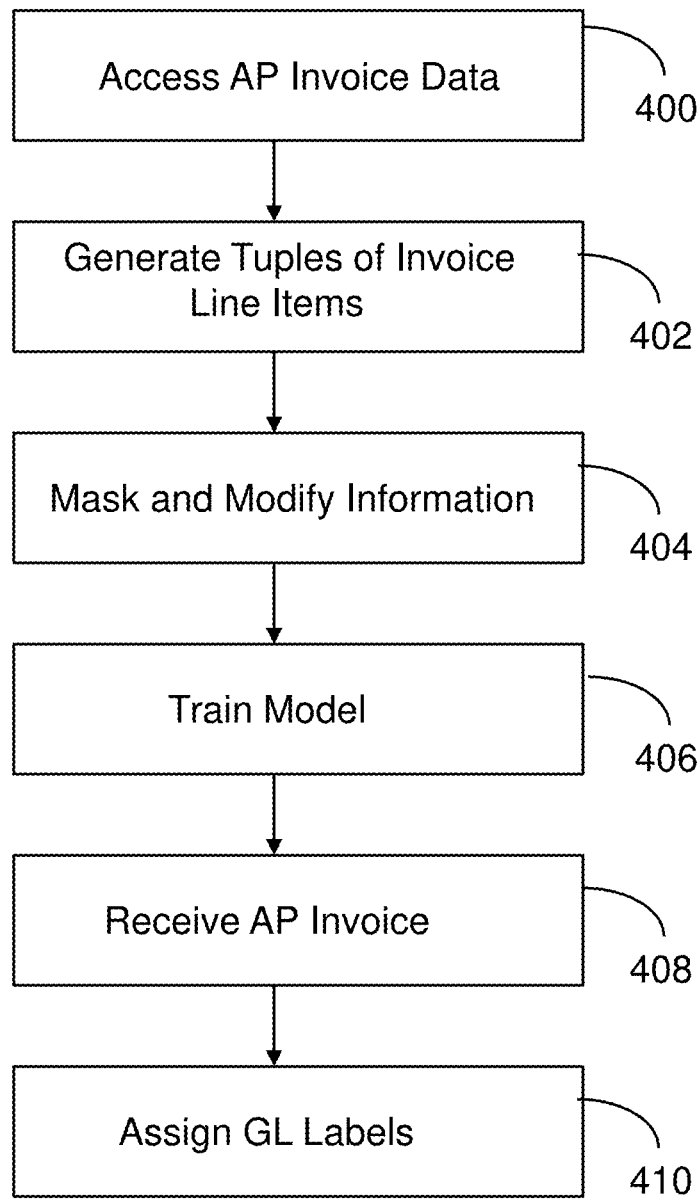
FIG. 4 illustrates GL coding module operations performed in accordance with an embodiment of the invention.

The GL coding module 146 performs the operations of FIG. 4. AP invoice data is accessed 400. Tuples of invoice line-items are generated 402. Information is masked and modified 404, as detailed below. The conditioned input data is then used to train GL models 406. Thereafter, an AP invoice is received 408. The trained GL models assign GL labels to the received invoice 410.

Figure 5:
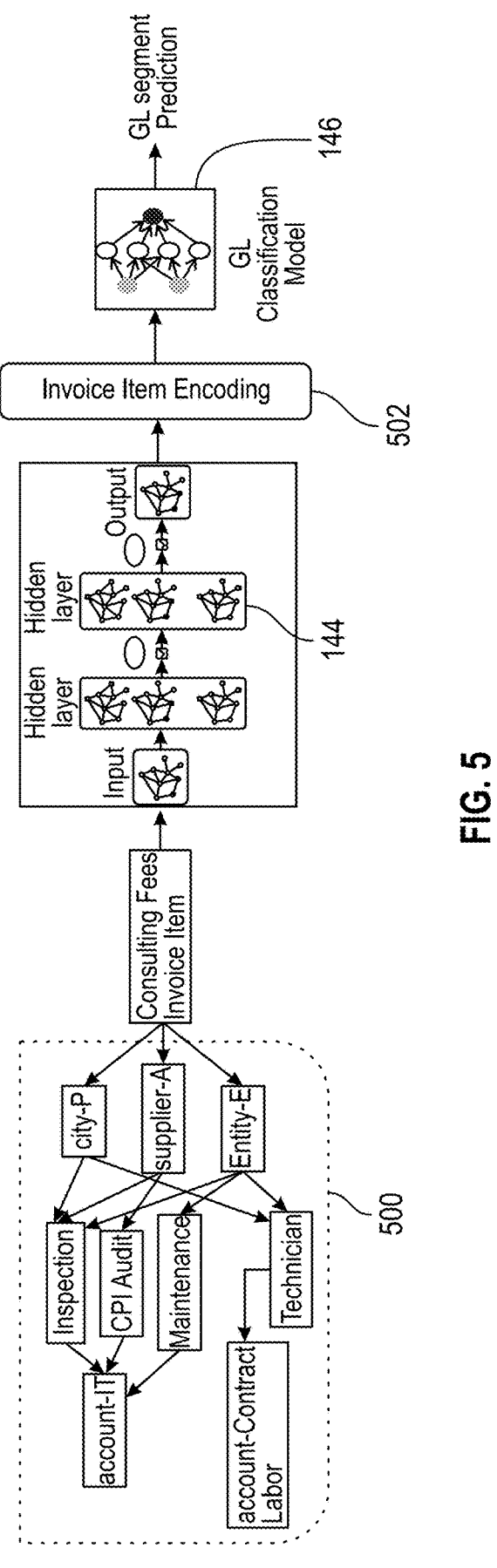
FIG. 5 illustrates invoice processing performed in accordance with an embodiment of the invention.

FIG. 5 shows a graph 500 for a received invoice related to consulting fees. The graph 500 has invoice item graph neighbors in the data store 142. That is, the data store 142 has a large graph of all previously processed consulting fees that can be used to find a closest match for the current invoice. The graph 500 of the current invoice is applied to the AI encoder 144, which produces invoice item embeddings 502. The invoice item embeddings 502 are applied to a trained GL model of the GL coding module 146 to produce a GL segment prediction. The invoice item embeddings 502 are matched in the previously discussed latent space to identify patterns and user behavior from the past to predict characterization of the new invoice.

GL code for any invoice item comprises a combination set of GL segment codes including but not limited to codes such as account code, cost center code, purpose code and others. Each GL segment code has a pre-known set of values that it can take.

The GL coding module 146 trains a classifier model for each segment code that can take in an invoice item, sample a subgraph around it using the previously discussed sampling techniques, and predict the segment code value for that invoice item. With this approach, the system obtains the unique capacity to learn past user preferences and custom behavior for correctly predicting GL segment code even in cases where the same item needs to have a different GL segment code value in different context (say when it comes from different suppliers, or served to different entities, or other more complex patterns that may not have an obvious commonplace understanding).

The data store 142 has a vast training dataset for the GL segment prediction model. Each training sample has an item description from a specific invoice line and its corresponding true GL segment label. To ensure a diverse and unbiased dataset, the training data incorporates augmentation techniques.

The augmentation process considers the data bias present in the input data derived from upstream models used in production. It aims to discourage the overreliance on any single predictive attribute. To achieve this, various augmentation techniques are employed. One such technique involves randomly masking features such as supplier, entity, location, etc., to simulate missing contextual information surrounding the invoice item. In another method of augmentation, some features are randomly modified to introduce conflicting contextual information. For instance, instead of using the correct contextual information for all the training data points, random selections can be made to omit or alter the supplier information when sampling neighbor contexts for one or more of the data points.

Figure 6:
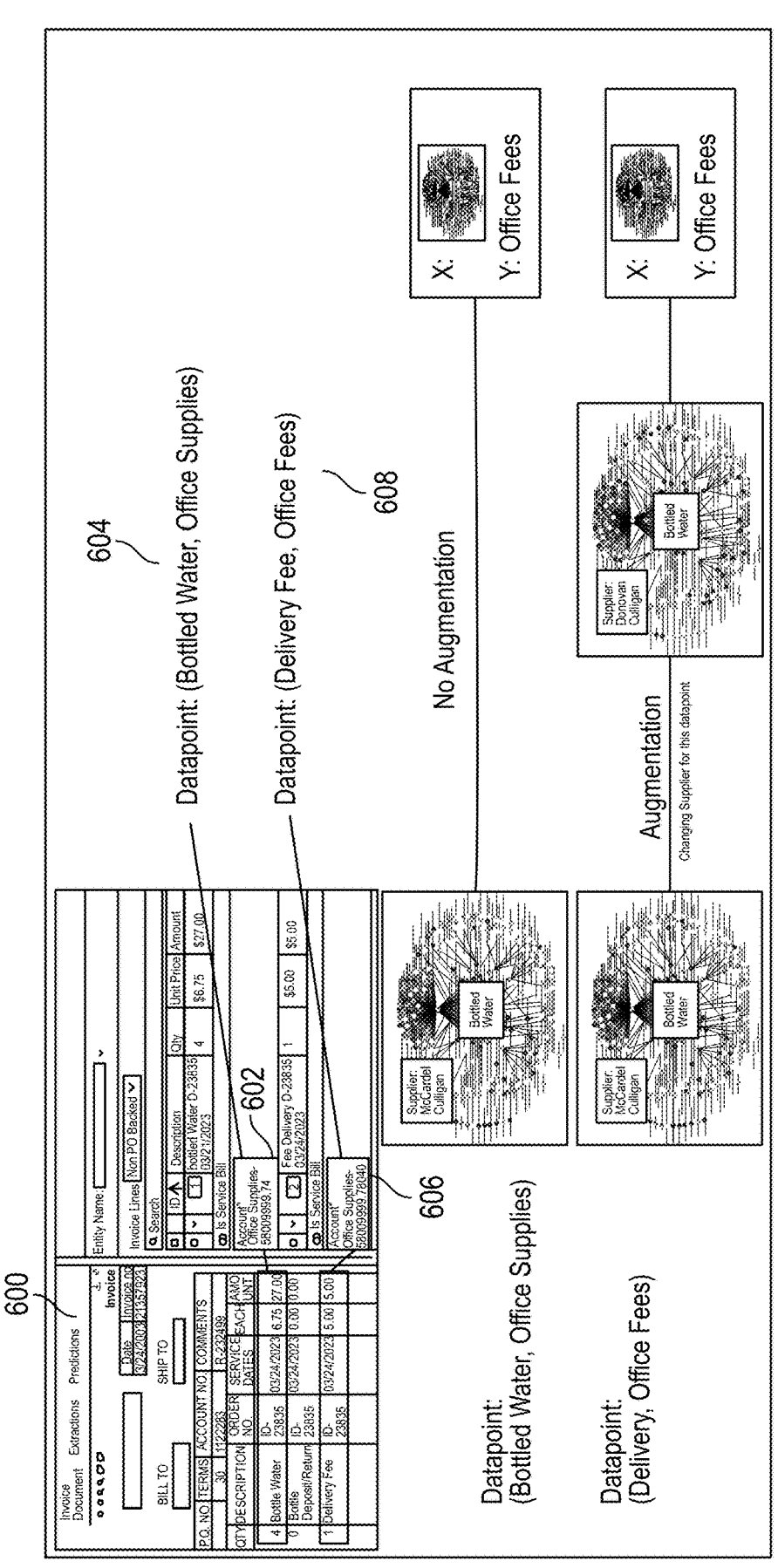
FIG. 6 illustrates tuple formation from an invoice and subsequent training augmentations performed in accordance with an embodiment of the invention.

FIG. 6 illustrates a received invoice 600 that has an accounts payable line-item 602 that is used to form a tuple 604 of (Bottled Water, Office Supplies), representing a purchased item and a category. Another accounts payable line-item 606 is used to form a tuple 608 of (Delivery Fee, Office Fees), representing a service charge and a category. In this scenario the GL coding module 146 may use the tuple 604 without any augmentation, but then augment the second tuple 608 by changing the supplier.

The augmentation techniques include masking and modifying information. In the case of masking, the GL coding module 146 may be configured to randomly mask features like supplier, entity, location, and the like to account for missing contextual information around the invoice item. In one embodiment, the GL coding module 146 randomly masks a single digit percentage of input information in the general ledger invoice line-item tuples to form a first set of revised general ledger invoice line-item tuples.

In the case of modifying information, the GL coding module 146 may be configured to present conflicting contextual information. For example, rather than using the correct contextual information for all tuples the GL coding module 146 can randomly choose to omit or change the supplier information when sampling neighbor contexts in one or more data points. In one embodiment, the GL coding module 146 modifies a single digit percentage of input information in the first revised general ledger invoice line-item tuples with mismatched values to form second revised general ledger invoice line-item tuples. The GL coding module 146 then trains a machine learning model with the second revised general ledger invoice line-item tuples to form a trained general ledger machine learning model.

When randomly selecting features to mask or modify, in one embodiment, the selection of augmentation targets is limited to a fixed number (e.g., 2) and the random selection is over the node types (which means each node type has an equal probability of getting augmented irrespective of how many nodes in the neighborhood belong to that type). Once a node type has been selected, a node of that node type that has not already been augmented is chosen at random from among the neighboring nodes of that type.

These augmentation techniques serve the purpose of avoiding overfitting to specific features and allow the model to learn predictions that align with the patterns and biases observed in the upstream models.

The GL models formed by the GL coding module 146 are designed to handle complex data by intelligently aggregating and learning from the multi-faceted information present in the graphs of the data store 142. Specifically, the model takes as input an invoice item node and its sampled heterogeneous neighborhood, which includes relevant nodes and their connections. This allows the model to capture the contextual information necessary for making accurate predictions.

The model itself utilizes the pre-trained AI encoder 144 and adds additional classification layers on top of the encoder model. This combined model is trained to minimize the cross-entropy classification loss between the predicted GL segment and the true GL segment. The training process uses stochastic batch gradient descent with backpropagation, enabling efficient optimization of model parameters using the Adam optimizer.

The combination of sampling techniques and the graph neural network model facilitates inductive learning, enabling the model to generalize well to new, unseen data. By learning richer prediction patterns. The models can make accurate predictions of GL segments for invoice items that have not been encountered before.

This heterogeneous graph neural network model represents a significant advancement in predicting GL segments for invoice items, as it effectively handles the complexity of the data and improves the model's ability to make accurate and generalizable predictions.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:

store accounts payable information in a graph database;

process the accounts payable information with a graph neural network encoder model to form embedding representations for node items withing the graph database, where the embedding representations capture semantic information and structural context from the graph database;

select from the graph database a subgraph associated with a node;

apply a corruption function to the subgraph to form a corrupted subgraph;

train the graph neural network encoder model with the subgraph and corrupted subgraph to maximize a score for the subgraph and minimize a score for the corrupted subgraph;

access an accounts payable invoice data set associated with the accounts payable information;

gather tuples of invoice line-items from the accounts payable invoice data set;

attach a general ledger label to each tuple to form labeled general ledger invoice line-item tuples;

randomly mask a single digit percentage of input information in the general ledger invoice line-item tuples to form first revised general ledger invoice line-item tuples;

randomly modify a single digit percentage of input information in the first revised general ledger invoice line-item tuples with mismatched values to form second revised general ledger invoice line-item tuples;

train a machine learning model with the second revised general ledger invoice line-item tuples to form a trained general ledger machine learning model;

receive an accounts payable invoice; and use the trained general ledger machine learning model to assign general ledger labels to items in the accounts payable invoice.

2. The non-transitory computer readable storage medium of claim 1 further comprising instructions executed by the processor to train the machine learning model using stochastic batch gradient descent with backpropagation.

3. The non-transitory computer readable storage medium of claim 2 further comprising instructions executed by the processor to minimize cross-entropy classification loss between a true general ledger segment and a predicted general ledger segment.

4. The non-transitory computer readable storage medium of claim 1 wherein the graph database has defined node types.

5. The non-transitory computer readable storage medium of claim 4 wherein each defined node type has a list of attributes.

6. The non-transitory computer readable storage medium of claim 1 wherein the graph database has defined node connection types.

7. The non-transitory computer readable storage medium of claim 1 further comprising instructions executed by the processor to:

select from the graph database a subgraph associated with a node; and evaluate the distribution of different node and edge types in the subgraph.

8. The non-transitory computer readable storage medium of claim 1 further comprising instructions executed by the processor to:

select from the graph database a subgraph associated with a node;

evaluate the distribution of different node and edge types in the subgraph to identify overrepresented and underrepresented node and edge types;

down sample the overrepresented node and edge types; and up sample the underrepresented node and edge types.

\* \* \* \* \*